United States Patent [19]
Ruiz

[11] Patent Number: 5,807,408
[45] Date of Patent: Sep. 15, 1998

[54] INDUSTRIAL ROBOT SAFETY DEVICE THAT SHUTS DOWN OPERATION IN REPONSE TO VARIATION IN TENSION OF A ROPE

[75] Inventor: Carlos M. Ruiz, Schnecksville, Pa.

[73] Assignee: Submicron Systems, Inc., Allentown, Pa.

[21] Appl. No.: 851,668

[22] Filed: May 6, 1997

[51] Int. Cl.⁶ .................................. B25J 19/06; F16P 7/02
[52] U.S. Cl. ............................ 901/49; 318/466; 318/558
[58] Field of Search .................................. 901/11, 13, 49; 318/466, 467, 468, 558; 338/903

[56] References Cited

U.S. PATENT DOCUMENTS

| | | | |
|---|---|---|---|
| 4,697,979 | 10/1987 | Nakashima et al. | 414/786 |
| 4,795,957 | 1/1989 | MacNeal, Jr. et al. | 318/568.11 |
| 5,280,622 | 1/1994 | Tino | 395/90 |

*Primary Examiner*—Bentsu Ro
*Attorney, Agent, or Firm*—Cobrin Gitttes & Samuel

[57] ABSTRACT

An industrial robot safety device and method for use in wet stations. A shutdown circuit is operative to deactivate the robot in response to operation of any one of two switches. Each switch responds to variations in tension that are beyond acceptable limits of an associated tensionable element, such as ropes or cables. The tensionable elements are respectively mounted on the left and right side of the robot in the paths of its travel.

12 Claims, 7 Drawing Sheets

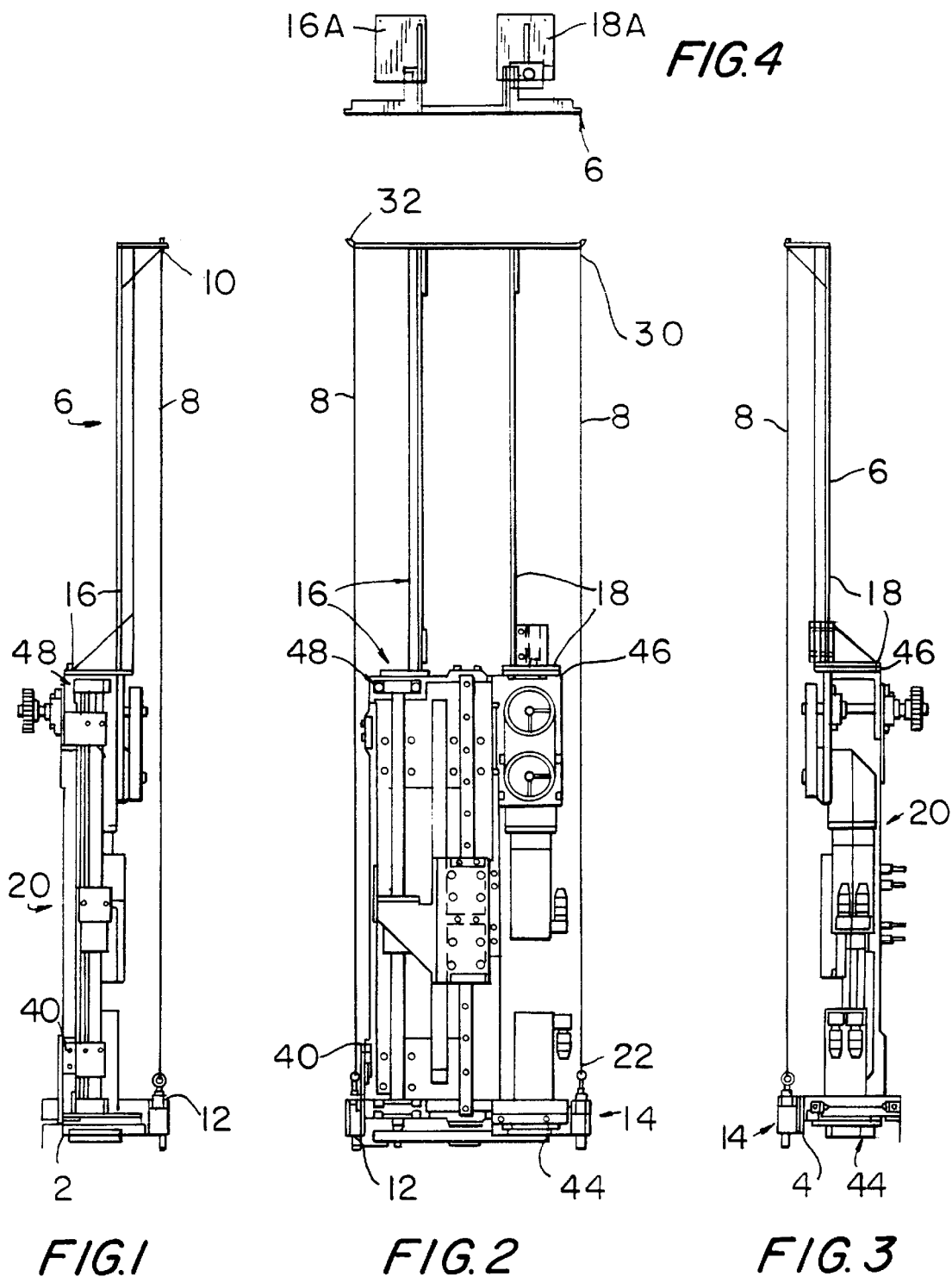

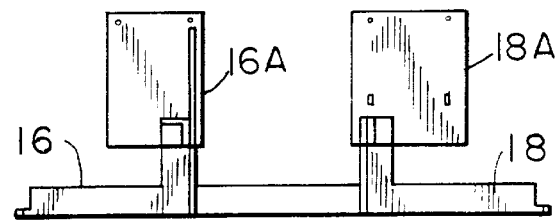
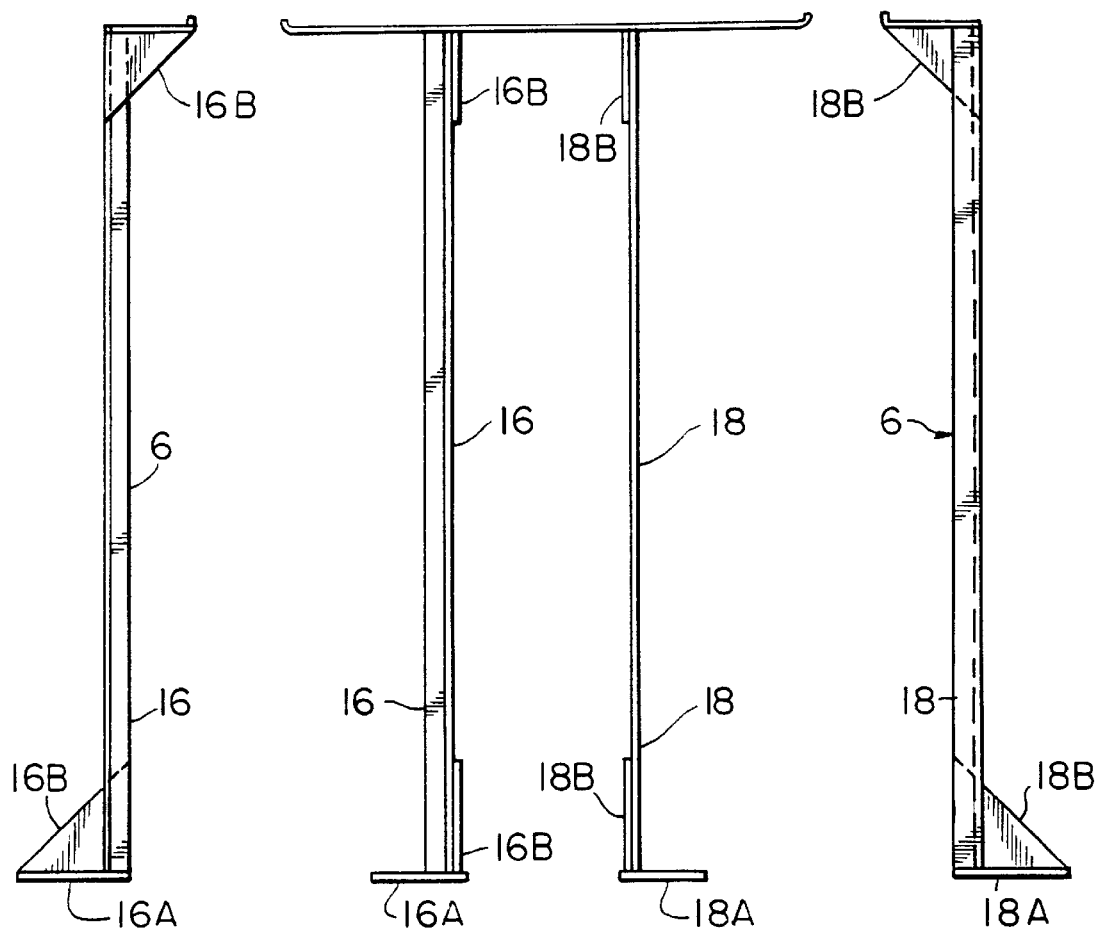
FIG. 12
FIG. 9   FIG. 10   FIG. 11

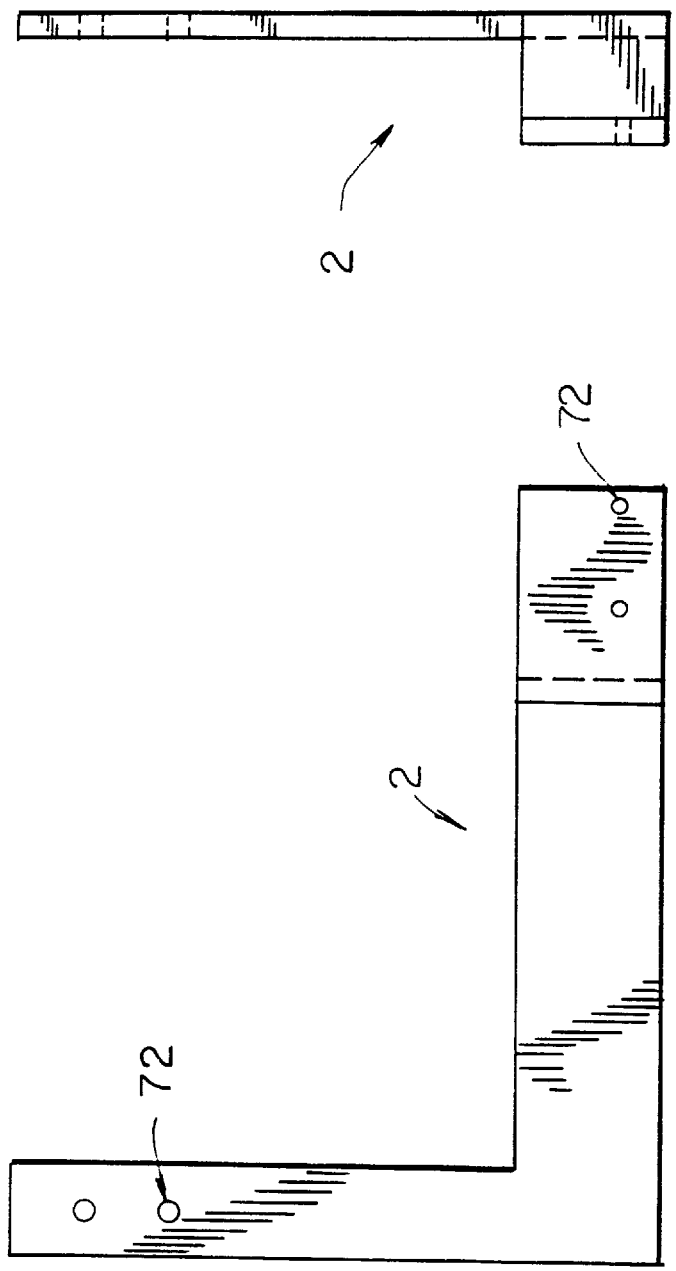

1

INDUSTRIAL ROBOT SAFETY DEVICE THAT SHUTS DOWN OPERATION IN REPONSE TO VARIATION IN TENSION OF A ROPE

BACKGROUND OF THE INVENTION

This invention relates to a protection arrangement to deactivate an industrial robot in response to an obstruction existing in the path of travel of the industrial robot.

A conventional industrial robot is available through Sub-Micron Systems of Allentown, Pa. for use in a semiconductor wafer wet station mini-environment. The mini-environment is an enclosure that contains a series of work stations to process semiconductor wafers and the operation of such work stations is conventionally known. The mini-environment is manufactured by HUNTAIR.

The industrial robot within the mini-environment is known to operate by traveling from work station to work station from one side of the enclosure to the other, lowering to each work station after reaching a position above them, moving horizontally to the left and/or right, and thereafter raising to reach an elevated position where it travels to a position above the next work station.

If an obstruction or a person gets in the path that the industrial robot is traveling, damage or injury may ensue. Conventionally, safety measures are known to be necessary to avoid such damage or injury, but a reliable safeguard suited to the conditions of the operation of the industrial robot traveling through the mini-environment has been lacking conventionally.

SUMMARY OF THE INVENTION

One aspect of the invention resides in an industrial robot safety device for robots used in wet stations, comprising a shutdown circuit operative to deactivate an industrial robot, at least one switch, at least two mountings spaced apart, a first of the mounting elements supporting the switch, and at least one tensionable element extending from a second of the mountings to the switch, the switch being responsive to variations in tension of the tensionable element that are beyond acceptable limits so as to trigger operation of the shutdown circuit to deactivate the industrial robot. The variations may be a decrease or an increase in the tension beyond the associated acceptable limit.

The industrial robot safety device provides a rope pull that, when triggered, shuts down the robot and prevents wet tool operators and service engineers from being injured when the robot is moving. Preferably, a vertical extension bracket is mounted to the top of the robot's torso and two brackets are mounted to the lower potion of the robot's torso. Attached to the lower mounted brackets are two rope pull safety switches. The switches are preferably double-pole switches which are normally closed. They are held in a neutral position by the tension of the rope.

If the rope is hit or pulled so that the tension is increased, or if the rope is broken so that the tension is released, the switch is either pulled by the rope to one pole or released to the other pole. In either case, the result is that the robot will stop. The safety pull rope, which may be 304 SST PFA coated rope, extends from the switches vertically to the bracket mounted to the top of the robot's torso. The device preferably requires a tension of 1.75 lbs. to activate. Tension less than that is within an acceptable limit and does not trigger activation of the shutdown circuit.

BRIEF DESCRIPTION OF THE DRAWINGS

For a better understanding of the present invention, reference is made to the following description and accompanying drawings, while the scope of the invention is set forth in the appended claims.

FIGS. 1–4 show respectively a left elevational side, a front elevational, a right elevational side and top plan views of a rope pull safety device and industrial robot in accordance with the invention.

FIGS. 9–12 show respectively a left elevational side, a front elevational, a right elevational side and top plan views of a top bracket for a rope pull switch and industrial robot in accordance with the invention.

FIGS. 13 and 14 show respectively left side elevational and front views of a left bracket for a left rope pull switch.

DESCRIPTION OF THE PREFERRED EMBODIMENT

Figure 5:
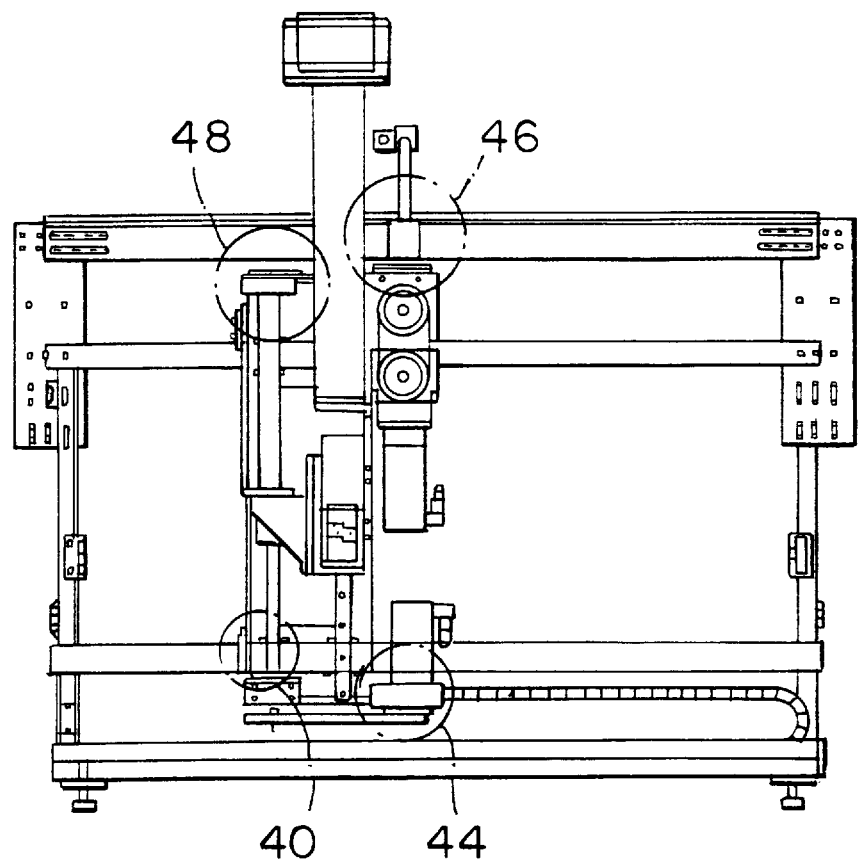
FIG. 5 shows an elevational front view as in FIG. 2 but with the robot shown in position on a track.

Referring to the drawings, FIGS. 1–4 show an industrial robot for use in a semiconductor wafer wet station with a rope pull safety device attached in accordance with the invention. The robot itself is conventional and preferably obtained from SubMicron Systems under the name GAMA ROBOT. The modification in accordance with the invention includes adding top and bottom brackets, a pull switch assembly and stainless steel TEFLON™ coated rope.

FIG. 1 shows the left bottom bracket 2 for the left rope pull switch 12 while FIG. 3 shows the right bottom bracket 4 for the right rope pull switch 14. FIG. 4 shows the top bracket 6. Between the top bracket 6 and each of the left and right pull switches 12, 14 extends a stainless steel Teflon™ coated rope 8. The brackets are installed to an industrial robot 20 in the manner described below.

Safety precautions: Completely drain all process tanks at the work stations to remove chemicals. Ensure that all chemical fumes are evacuated. Put the robot in joystick mode, setting the end effector to the highest position allowed and setting the robot torso to a location at which there is complete access from the front of the mini-environment enclosure when the access panel and window of the enclosure are open simultaneously. Ensure that the industrial robot is electrically disabled.

Installation of the left bottom bracket 2 is as follows. Locate lower vertical robot limit switch or sensor mounting plate 40 in reference to the robot torso. Remove the existing sensor plate fasteners and place the left bottom bracket 2 on top of the sensor mounting plate 40 and secure with fasteners. Match the sensor location with the mark made previously and arrange the bracket 2 parallel to the floor, i.e., horizontally level. Mount the rope pull switch 12 with its ring on the top position and provide a top label on it facing toward the center of the robot torso of the robot 20.

Installation of the right bottom bracket 4 is as follows. Locate the lower flexible conduit mounting bracket 44. Remove its fasteners and place the right bottom bracket 4 on top of the flexible conduit mounting bracket 44 and install with fasteners. Mount the rope pull switch with its ring in the top position and with a label on it facing toward the center of the robot torso.

Installation of the top bracket 6 is as follows: Locate the robot product detector arm mounting bracket 46. Conveniently secure the product detector arm to prevent it from dropping when removing existing fasteners. Place the base plate 18A of the right section 18 of the top bracket 6 between the robot torso top end and the product mounting bracket 46 and secure with fasteners. Preferably, the right section of the top bracket 46 has a four hole pattern with slots facing toward the mini-environment. Next, locate the top end robot torso left hole pattern 48. Attach the base plate 16A of the left section 16 of the top bracket 6 to the top end robot torso left hole pattern 48 with fasteners.

Installation of the rope 8 is as follows. At the left side of the top end 10 of the rope 8, make a loop 10 (such as with a ½ inch inside diameter), insert the shrink tubing 22 (such as one inch length) and a sleeve, secure the loop 10 with a crimp tool and place the shrink tubing 22 on top of the sleeve and open rope end. Apply heat with a heat gun to encapsulate all exposed metal at the sleeve and rope end. Place the loop 10 around the top left bracket end hook 32. Ensure that the left pull switch 12 is mounted such that housing mounting slots have clearance above mounting screws. The clearance is required for further pull switch and rope pre-tensioning condition.

Next, pass the rope 8 through a switch ring and establish the appropriate rope length by simulating the final loop assembly at the bottom bracket. Cut the rope to the established length. From the rope end, insert shrink tubing (preferably one inch in length) and a sleeve and insert the rope end through the open sleeve to complete the loop. Holding the sleeve, pre-tension the rope to approximately 4.1 lbf (1.89 kgf) so that the switch stem displaces only $\frac{1}{16}$ inches. Secure the loop 10 by crimping the sleeve with a crimping tool. Place the shrink tubing on top of the sleeve and open rope end and apply heat with a heat gun to encapsulate all exposed metal, i.e., sleeve and cable end. Repeat the above installation procedure for the right side of the rope assembly by forming an analogous loop 30.

Figure 6:
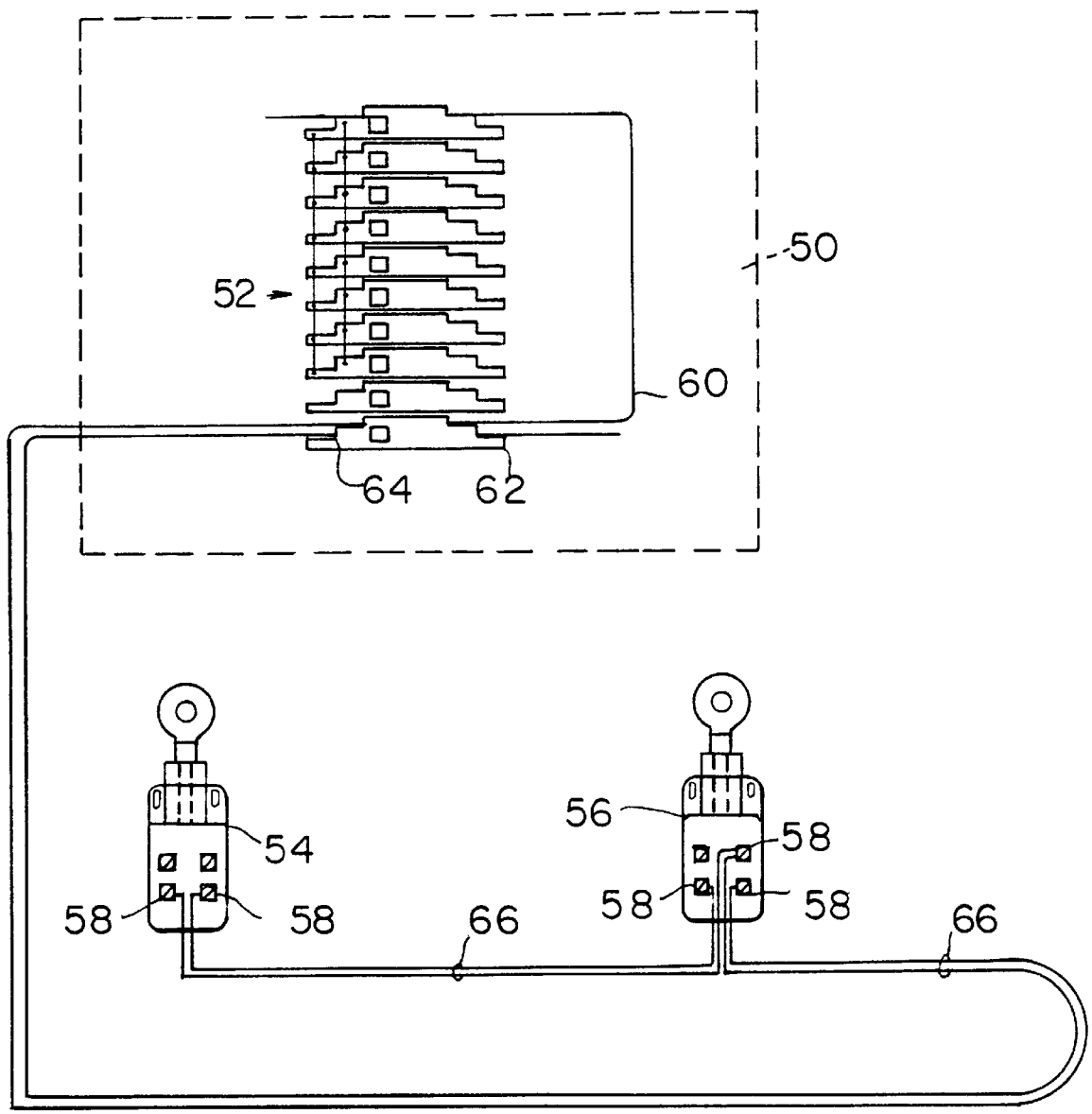
FIG. 6 shows an electrical schematic of a robot pull switch to be used in the invention.
Figure 7:
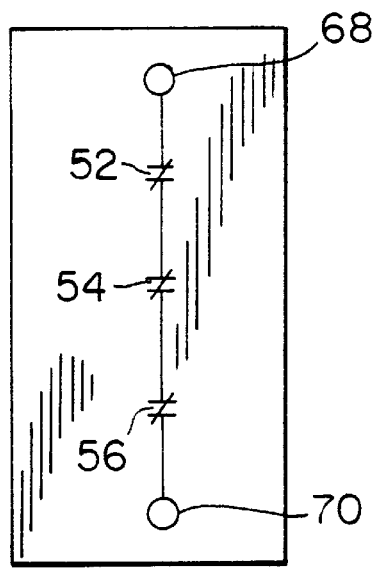
FIG. 7 shows a further electrical schematic representation of FIG. 6.

The robot controller box is modified in accordance with the schematics of FIGS. 6 and 7. Fish wire through the existing robot flexible conduit. Use tight wraps to secure the wire with the lines that are going to a motor control box. Before final hookup of the rope pull circuitry to the terminal block inside the robot motor controller box, check for continuity while manually actuating the pull switch via the rope. When the rope is pulled or displaced horizontally by a desired safety distance such as approximately one inch, the circuitry should be open to stop operation of the robot. Thus, when the rope is pulled or displaced horizontally by less than the desired safety distance, no shutdown will occur since the rope displaced is within tolerable limits. Only reaching or exceeding those limits triggers shutdown.

FIG. 6 is an electrical schematic of the robot pull switch such as a double pole throw switch. There is an inside robot controller box 50 with a robot stop or interlock switch 52, a left pull switch 54, a right pull switch 56 and terminals 58 to which the robot pull switch circuit is inserted in series into the robot stop circuit. Also shown in the robot controller box 50 is 18 AWG wire 60 connecting terminals 62 of throw switch 56 and a contact location 64 for cable 66 leading to the left and right pull switches 54, 56. FIG. 7 shows a schematic diagram of FIG. 7 with a robot stop switch 52, a left pull switch 54, a right pull switch 56, all connected in series between a power supply 68 such as 24V-DC and a POS terminal such as in an electric tower 70.

Figure 8:
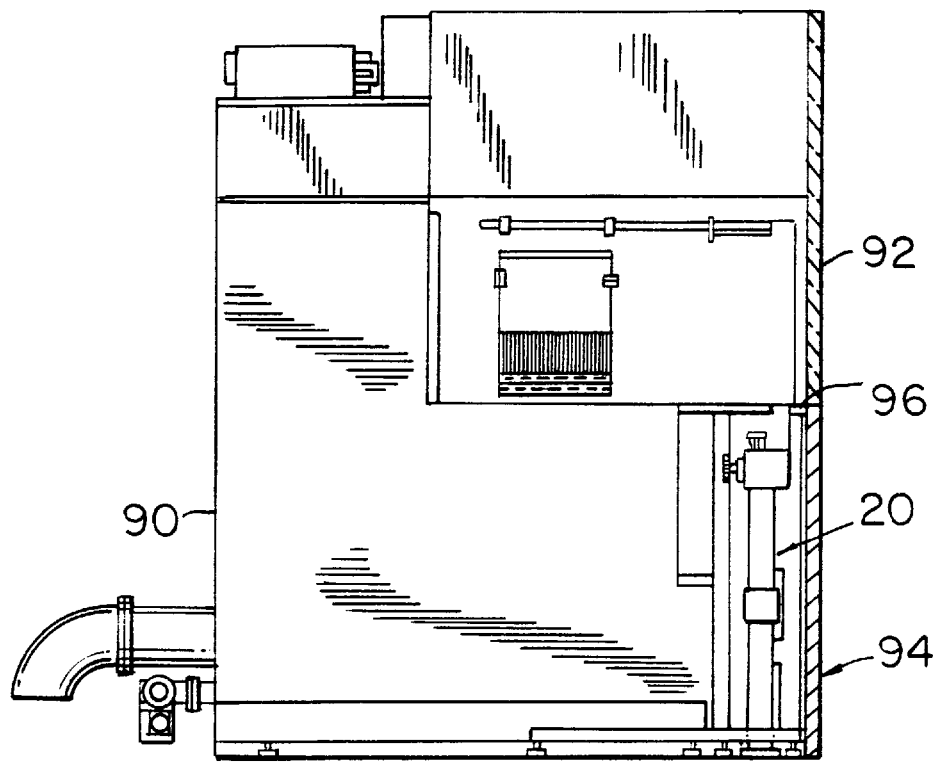
FIG. 8 shows the invention of FIGS. 1–4 in position within a mini-environment and supported along a track as in FIG. 5.

FIG. 8 shows the robot with mounting brackets and robot pull assembly within a mini-environment enclosure 90 having an access window 92 and an access panel 94. Between the access window 92 and the access panel 94 is an extra lip or edge 96, which is fastened to the mini-environment enclosure 90 by fasteners. Such an edge may be safely removed to allow the rope 8 (see FIGS. 1–4) to ride free close to a pinch section between the wall of the mini-environment enclosure and sections of the robot 20.

Suitable rope pull switches are manufactured by EEControls, type ES51Z 10/1S and a suitable rope is a TEFLON™ coated 304 stainless steel manufactured by Reid Tool Supply Company, model no. CBL-375 with a $\frac{1}{16}$ inch diameter wire coating and 0.084 inch outside diameter, After installation, the rope pull safety device functions to disable the robot when it encounters an obstruction, (as the joystick stop button does), during the horizontal left or right moves.

As described, the vertical extension bracket will be put in place and fixed to the robot torso top end section. This component will extend the height of the mini-environment access window. At the same time there is attached to bottom section of the Gama robot torso two mounting brackets to hold two rope pull CE rated safety switches, respectively.

Attached to the lower mounted brackets as mentioned above, will be the rope pull safety switches. From this location the rope will extend vertically to the top end "T" bracket giving maximum coverage (lower access panel and access window).

The safety device will require 1.75 LBS to actuate, giving maximum sensitivity with a horizontal rope displacement of 0.75", 2.00" before any contact with the robot torso, vertical section or any hard fixed pinch point.

The rope pull interlock switches are Normally Close contacts, which are connected to the robot stop interlock circuit. Activation of the pull switch or any break in the circuit, (broken wire or loose connection), will cause the robot to stop.

Figure 15:
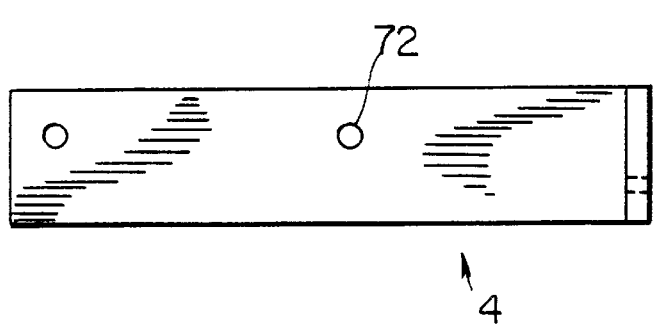
FIGS. 15 and 16 show respectively left side elevational and front views of a right bracket for a right rope pull switch.
Figure 16:
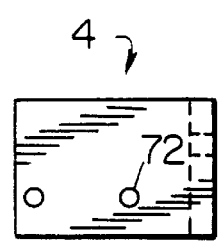

For ease in understanding, FIGS. 9–12 show the top rope pull bracket 6, with the left rope pull portion 16 and the right rope pull portion 18. Each has a respective base plate 16A, 16B that attaches to the robot torso and side angle plates 16B, 18B that extend at a 45 degree angle to help stabilize the bracket structure. FIGS. 13 and 14 show the left bottom bracket 2 with holes 72 and FIGS. 15 and 16 show the right bottom bracket 4 with holes 72.

While the preferred embodiment employs three mounting brackets, the top bracket could be divided into two separate left and right top mounting brackets so as to provide for a total of four brackets instead of three. Alternatively, the two mounting bottom brackets could be connected together, thereby providing for a single lower bracket that extends between the left and right sides of the robot, i.e., in the path of travel of the robot to the left or right direction as applicable. The rope may be any type of tensionable element, such a cable.

While the foregoing description and drawings represent the preferred embodiments of the present invention, it will be understood that various changes and modifications may be made without departing from the spirit and scope of the present invention.

What is claimed is:

1. An industrial robot safety device, comprising:
   a shutdown circuit operative to deactivate an industrial robot;

a switch;

at least two mountings spaced apart;

a first of said mountings mounting said switch; and a tensionable element extending from a second of said mountings to said switch, said switch being responsive to variations in tension of said tensionable element that exceed acceptable limits so as to trigger operation of said shutdown circuit to deactivate the industrial robot, said variations being any of a decrease and an increase in the tension beyond associated ones of the acceptable limits.

2. A device as in claim 1, further comprising an industrial robot to which said mountings are attached.

3. A device as in claim 2, further comprising a mini-environment enclosure containing a plurality of stations that accommodate semi-conductor wafers, said robot being within said enclosure and traveling between said stations.

4. A device as in claim 3, wherein said enclosure has a ceiling with an opening and said second mounting extends into said opening throughout a traveling movement of said robot from an elevation higher than an underlying one of said stations to an elevation within said underlying one of said stations.

5. A device as in claim 3, wherein said tensionable element is spaced sufficiently from said enclosure to avoid being pinched between said enclosure and said robot.

6. A device as in claim 2, wherein said industrial robot is movable in a left direction and in a right direction and has a left side facing the left direction and a right side facing the right direction, said tensionable element being spaced from the left side in a path of travel of the robot as the robot travels in the left direction; further comprising a further switch; and a further tensionable element extending from said further switch and spaced from the right side in a path of travel of the robot as the robot travels in the right direction, said further switch being responsive to variations in tension of said further tensionable element that are beyond acceptable limits so as to trigger said shutdown circuit to deactivate the robot.

7. A device as in claim 1, wherein said switch is a double pole switch that is in a normally closed condition while said tensionable element is under tension of a magnitude that is within said acceptable limits, said tensionable element being attached to said double pole switch.

8. A method of deactivating an industrial robot for safety, comprising the steps of:

mounting a switch on one of two mountings and extending a tensionable element between the switch and the other of the two mountings; and deactivating the industrial robot with a shutdown circuit operable in response to the switch; said switch responding to variations in tension of the tensionable element that exceed acceptable limits so as to trigger operation of the shutdown circuit to deactivate the industrial robot, the variations being any of a decrease and an increase in the tension beyond associated ones of the acceptable limits.

9. A method as in claim 8, wherein the step of deactivating prevents the industrial robot from traveling between stations that accommodate semi-conductor wafers within a mini-environment enclosure in which the industrial robot is positioned.

10. A method as in claim 9, wherein the enclosure has a ceiling with an opening, further comprising the step of extending one of the mountings through the opening throughout a traveling movement of the industrial robot from an elevation higher than an underlying one of the stations to an elevation within the underlying one of the stations.

11. A method as in claim 9, further comprising the step of keeping the tensionable element free of being pinched between the enclosure and the industrial robot.

12. A method as in claim 9, wherein the tensionable element is in a path of the industrial robot as the robot travels in a leftward direction, further comprising a further tensionable element in a path of the industrial robot as the robot travels in a rightward direction, the shutdown switch being responsive to operation of a further switch connected to the further tensionable element, the further switch responding to variations in tension of the further tensionable element that exceed acceptable limits so as to trigger operation of the shutdown circuit to effect the deactivating.

* * * * *